INVENTORS H. S. FEDER
F. K. MANASSE
BY
R. C. Winter
ATTORNEY

INVENTORS H. S. FEDER
F. K. MANASSE
BY R. C. Winter
ATTORNEY

United States Patent Office 3,068,322
Patented Dec. 11, 1962

3,068,322
SWITCHING SYSTEM

Herbert S. Feder, Fanwood, and Fred K. Manasse, Hopewell, N.J., assignors to Bell Telephone Laboratories, Incorporated, New York, N.Y., a corporation of New York Filed May 28, 1959, Ser. No. 816,437
14 Claims. (Cl. 179—15)

This invention relates to electrical transmission circuits and more particularly to transmission circuits including gating networks applicable to information processing and transfer.

A practice receiving widespread attention in high speed, information handling systems is the time sharing of a common transmission link among a plurality of communicating pairs of information sources. Time sharing, or time division multiplexing, requires that in successive short time intervals each pair of information sources or terminals in communication be assigned a frequently recurring discrete interval of time or time slot during which information may be interchanged via the common transmission link. Intermediate the cyclic appearances of a time slot assigned to a particular pair of terminals, the common transmission link is available to other communicating pairs of terminals in their respective preassigned time slots.

Time sharing may be utilized, for example, in a telephone system wherein connection of a plurality of communicating pairs of telephone subscriber lines is implemented via a common communication link, thereby realizing a substantial reduction in expensive transmission facilities. A system of this type is described, for example, in a patent application of D. B. James, J. D. Johannesen, M. Karnaugh and W. A. Malthaner, Serial No. 760,502, filed September 11, 1958, now Patent No. 2,957,949, issued October 25, 1960.

The accurate reproduction of cyclically sampled information transmitted over a common link between a plurality of communicating pairs of terminals depends upon strict minimization of signal losses in transfer as well as sampling at a prescribed rate. Among the factors tending to produce losses in such a system are leakage of signal through imperfect gating circuits which periodically connect the lines to the link and storage or trapping of signal in parasitic capacitance of the common link. Any portion of the signal which is trapped in the common link during transfer between subscriber lines interconnected in one time slot will interfere with the signal transferred between the subscriber lines interconnected in the succeeding time slot. Such interference is commonly referred to as "crosstalk." In systems utilizing the transfer techniques disclosed in the James et al. patent and serving a larger number of telephones, the resultant crosstalk may be sufficient to affect the intelligibility of a telephone conversation.

The sampling technique utilized in the aforementioned James et al. patent is based upon a principle referred to as "resonant transfer," a circuit for the operation of which is disclosed in a patent application of W. D. Lewis, Serial No. 633,358, filed January 9, 1957, now Patent No. 2,936,337, issued May 10, 1960. Operation in accordance with this principle permits sampling of the information at a particular terminal by operation of a gate intermediate the terminal and the common link during a discrete time slot of a repetitive cycle of time slots.

The length of time that the gate remains operated is established by the time required for transfer of an information sample through the gate from one storage condenser to a second storage condenser in a circuit including an inductive element in series with the storage condensers and gating circuit. After one half-cycle at the resonant frequency of the tuned circuit formed by these elements, transfer of the information sample is complete, and before any retransfer of the sample through the gate can be effected, the gate circuit is disabled.

Theoretically, resonant transfer is accomplished without loss or crosstalk. However, considering the loss encountered in each line gate and the stray capacitance in the common link, sufficient capacitance intermediate the gates may be present in large systems to produce a harmful crosstalk level and imperfect signal transfer.

The line gates proposed for use in the James et al system are of the type disclosed, for example, in an application of J. D. Johannesen, P. B. Myers and J. E. Schwenker, Serial No. 570,530, filed March 9, 1956, now Patent No. 2,899,570, issued August 11, 1959, and comprise a pair of transistors arranged for bilateral transmission in an unbalanced network. Such gates are effective in reducing leakage losses to a minimum but are less economical than other gates known in the art. Such other gates, in turn, are less reliable in unbalanced systems than the specified transistor gate.

Such systems may be operated on a balanced or unbalanced basis. For unbalanced transmission, one side of the common communication link is grounded, and proper terminations are provided to connect the unbalanced common link to the balanced terminating line circuits. The balanced system, in turn, provides direct connections between each conductor of the terminating line circuit and corresponding conductors of the common link. Distinct advantages are presented by each of the balanced and unbalanced systems. In accordance with this invention, a balanced system is chosen which permits adoption of a type of line gate utilizing economical, readily available components and achieving operating characteristics comparable to those achieved by the transistor gates employed in unbalanced systems. It also permits provision of elements in the common link which reduce crosstalk and act in concert with the line circuits to permit proper line gate operation.

It is a general object of this invention to provide an improved signal transfer circuit.

More specifically, it is an object of this invention to provide an improved time division switching system capable of transferring information between pairs of terminals over a common communication link.

It is another object of this invention to provide a balanced transmission system with an improved gating circuit.

It is a further object of this invention to provide an efficient, economical and reliable balanced transmission line gating circuit.

It is still another object of this invention to overcome transmission problems encountered in a time division switching system due to signal transfer losses.

These and other objects of this invention are attained in one specific illustrative embodiment of this invention wherein a time division switching system of the type described in the aforementioned application of James et al. comprises a line gate individual to each circuit, each line gate serving to connect storage means in the corresponding line circuit to a balanced common communication link during a selected, cyclically recurring time interval.

The storage means in each line circuit comprises capacitance means, and upon concurrent enablement of the line gates for a pair of lines in communication, a series circuit is completed through the common link including the storage capacitance of each line and inductance means. The line gates are enabled for a period equivalent to one half-cycle at the resonant frequency of the series circuit such that a resonant transfer of signals stored in the respective shunt capacitances is effected.

Each line gate comprises a diode in each conductor of the corresponding line circuit, a source of bias potential connected intermediate the line conductors so as to normally back-bias the diodes, and means for coupling an enabling signal source to the intermediate connection so as to break down the diodes and permit the aforementioned resonant transfer operation. Such enabling signals are provided in appropriate timing from a common control source serving all line circuits in the system.

The common communication link comprises resistance means shunting common link capacitance means. The resistance means affords a direct-current path for the line gate biasing potential of each line circuit. The common link capacitance means provides a return path for pulse current utilized to break down the line gate diodes, and in addition its value is established at two-thirds the value of the line storage capacitance. This capacitance value permits a signal transfer, referred to as "harmonic transfer," which successfully eliminates difficulties arising from losses encountered in the resonant transfer operation.

The timing of the gate operation in this system is arranged such that a pair of gates corresponding to lines in communication are operated simultaneously to effect an interchange of information therebetween. Upon completion of such transfer, the signals for operation of the pair of line gates are removed, and a clamping gate in the common link is operated to assure that any signal remaining in the line storage capacitance and common link capacitance is removed. Upon completion of the clamping operation, the signal enabling the clamping gate is removed and the next communicating pair of line circuits have their respective line gates enabled.

Thus it may be seen that the unique combination of diode line gate and harmonic transfer storage capacitance in the common link of a balanced network provides an efficient, economical and flexible arrangement readily adaptable to communication systems operating on a time division basis.

It is a feature of this invention that a balanced gated network in a time division communication system comprise a line gate in each two-conductor line circuit including a diode in each line conductor.

It is another feature of this invention that the network comprise a storage capacitance in each line circuit and a harmonic transfer capacitance in the common link interconnecting the line circuits.

It is a further feature of this invention that a source of bias potential be connected to the line gate diodes through a circuit including inductance means and resistance means shunting the harmonic transfer capacitance in the common link.

It is a still further feature of this invention that line gate enabling means be coupled to a circuit including the diode biasing potential source, the line storage capacitance, and the harmonic transfer capacitance.

It is yet another feature of this invention that clamping means in the common link be operated upon removal of line gate enabling signals in order to discharge any signal remaining in the harmonic transfer capacitance.

A complete understanding of these and other features of the invention may be gained from consideration of the following detailed description, together with the accompanying drawing, in which.

Figure 1:
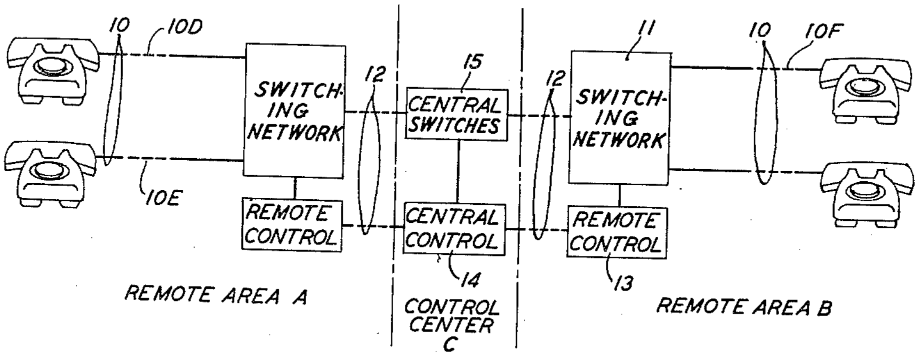
FIG. 1 is a schematic representation in block diagram form of a telephone system in which the time division switching and harmonic transfer arrangement in accordance with this invention may be employed.

Turning now to the drawing, the basic elements of a time division communication system in which our invention may be incorporated are depicted in FIG. 1. This system, particularly adapted to telephone communication, is disclosed in the aforementioned James et al. patent. As shown therein, a plurality of subscriber lines 10, grouped in proximity in a plurality of remote areas, are selectively connected by a switching network 11 to a control center comprising control apparatus 14 and switching apparatus 15 over common communication links 12. Equipment in the central control 14 is operated, for example, in accordance with signals from a subscriber line 10D in remote area A to complete a connection through the central switches 15 to a called subscriber line 10F in remote area B or through its own switching network 11 to a called subscriber line 10E in the same remote area.

The system is operated on a time division multiplex basis in which each subscriber line 10 desiring service is assigned a particular sampling period or time slot in a recurrent cycle of time slots. Upon each occurrence of a time slot assigned to a particular calling subscriber line such as 10D, a sample of information is transmitted from his line through the switching network 11 to the common link 12 and through the same or a similar switching network 11 to the called subscriber line 10E or 10F.

Information as to the condition of a subscriber line 10; e.g., idle, busy on an established connection, or desiring to have a connection established to it, is obtained by the remote control 13 connected between the remote switching network 11 and the central control 14 by a control lead of the common communication link 12. The remote control 13 serves to transmit control signals to selected line gates in the switching network 11 upon receipt of directive signals from the central control 14.

The resultant connections and disconnections of the line gate circuits occur rapidly and in a selected sequence for precisely timed intervals during which signal samples are transferred between the subscriber lines 10 via the common communication link 12. A particular control operation which permits service between subscribers in the same remote area without requiring transmission of the information signals to the control center is disclosed in an application of M. A. Townsend, Serial No. 803,616, filed April 2, 1959.

Figure 2:
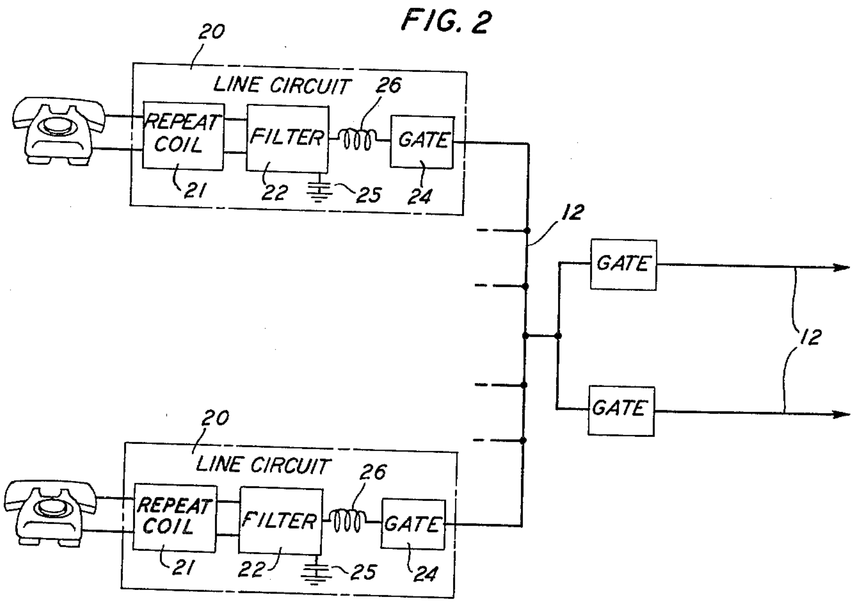
FIG. 2 is a schematic representation of a time division switching and resonant transfer arrangement in an unbalanced transmission system, as known in the art.

As shown in FIG. 2, a time division switching and resonant transfer arrangement employed in the system of FIG. 1, as disclosed in the aforementioned Townsend application, comprises a repeat coil 21, a filter 22, and a line gate 24 in each line circuit 20. That portion of the common communication link 12 which interconnects line circuits 20 in the same telephone exchange area, comprises merely an unbalanced transmission line.

A connection is established between the subscriber lines 20 on a time division basis by enablement of the line gate 24 in each of the selected line circuits 20 during a distinct time interval. A signal sample stored in the grounded line storage capacitance 25 at the output of the filter 22 then is transferred through a resonant transfer inductance 26, the associated line gate 24 and the common link 12, to the other active line circuit. The grounded line storage capacitance provides a return path for the signals transmitted over the unbalanced transmission line 12.

The transfer operation requires that the gates 24 be disabled after sufficient time has elapsed for a complete transfer of stored energy from one line storage capacitance to the other. This time interval is equivalent to one half-cycle at the resonant frequency of the tuned circuit including the line storage capacitance 25, inductance 26, and common link 12.

The gating circuit 24 of the James et al. patent and Townsend application comprises two transistors connected to provide bilateral transmission upon receipt of a gating signal applied to a connection between the common base and common emitter electrodes of the transistors. The transistor collector electrodes are connected to the line circuit and common link, respectively.

Theoretically, the line gates display an infinite impedance to the transfer of signals when in the disabled state and zero impedance when in the enabled state. Such gate conditions, coupled with a theoretical lossless resonant transfer operation, are not fully realized in practice, due to imperfect gates and signal storage in the common link. Such loss-producing conditions may be sufficient in systems involving a large number of lines, to cause noticeable signal distortions and crosstalk.

Figure 3:
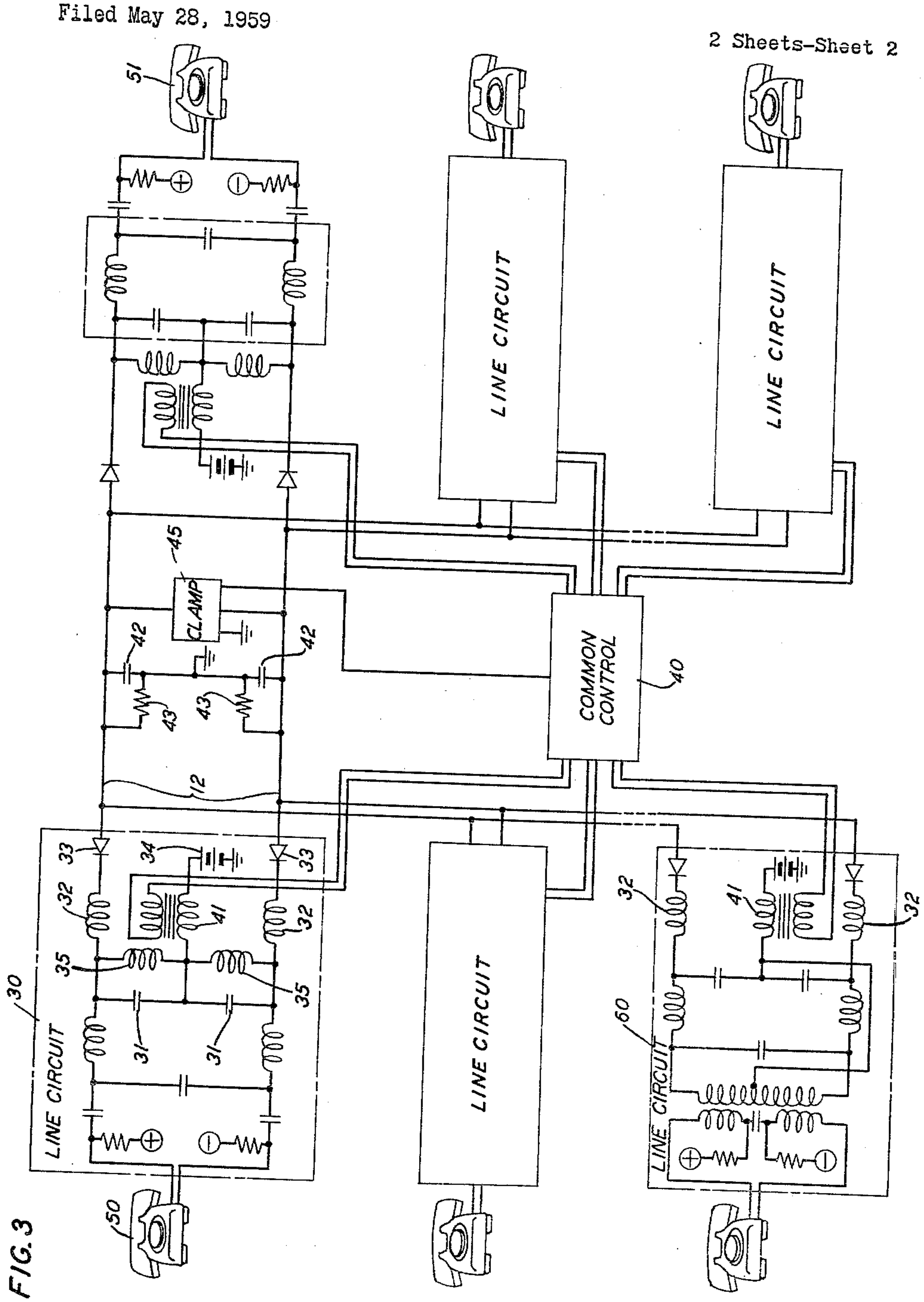
FIG. 3 is a schematic representation of an illustrative embodiment of the time division switching and harmonic transfer arrangement in accordance with this invention, which may be employed in the telephone system of FIG. 1.

FIG. 3 depicts a time division switching and harmonic transfer arrangement in a balanced transmission system in accordance with this invention. The harmonic transfer operation, which will be described hereinafter, serves to overcome the effects of losses encountered in the resonant transfer operation. The elements required to provide such harmonic transfer are uniquely combined with a balanced diode line gate to provide operating characteristics comparable to those provided by the two-transistor gate indicated in the circuit of FIG. 2, while incorporating economical and readily available components.

Each line circuit 30 comprises, in each conductor of the balanced line, filter elements terminated in a line storage capacitance 31 and a resonant transfer inductance 32 connected to a diode 33 which advantageously may comprise a p-n junction diode as known in the art. A bias source 34 is connected to like electrodes of the diodes 33 through a circuit including inductance elements 35 shunting the respective line storage capacitance 31 on each side of the line. The source 34 is sufficient to back-bias the diodes 33 and maintain them disabled. Such back-bias is enhanced by the charge placed on one of the line storage capacitors 31 which is in the proper direction to effect such a back-bias. Disablement of one of the line gate diodes 33 is sufficient to hold the line circuit disabled in such a balanced arrangement. However, the insertion of the bias source 34 and its series connection through inductance 35 to like electrodes of the diodes 33 insures maintenance of the proper back-bias.

Enablement of the line gate in selected line circuits 30 is realized by coupling a signal from the common control 40 through transformer 41 to the diode biasing circuit intermediate the biasing source 34 and the inductance 35. The control signal is of such polarity as to overcome the back-bias on diodes 33 provided by the source 34 and the signal stored in the line storage capacitors 31. Thus the diodes 33 of the selected lines assume a low impedance state and permit the interchange of signals stored in their respective storage capacitors 31 via the common link 12.

A problem is frequently encountered in time division switching circuits in preventing the gate control signal from entering the line circuit in such a manner as to become a part of the signal stored in the line storage capacitance. In accordance with this embodiment of our invention, capacitance 42 is inserted between ground and each conductor of the common transmission link 12. Such capacitance thus provides the required return path for gate control signals, such a path for each conductor being traced from the transformer 41 through a line storage capacitor 31, resonant transfer inductance 32, line gate diode 33, common link capacitance 42, and via ground and the bias source 34 to the transformer 41. Similarly, a return path for the direct-current bias signal is provided by resistance 43 in the common link 12 shunting the capacitance 42. Thus a direct-current path in each conductor is completed from the source 34, through the secondary coil of the transformer 41, inductance 35 and 32, diode 33, resistance 43, and back to the source 34 via ground.

The advantage derived from providing a return path through the common link capacitance for the line gate operating signal would appear to be offset by the deliberate insertion of capacitance in the common link where the presence of parasitic capacitance is normally a deterrent to fault-free time division transmission. In accordance with this embodiment of our invention, we have found that establishment of a particular value of capacitance 42 improves, rather than hinders, the resonant transfer operation in a time division system. Such an operation is referred to as "harmonic transfer" in which the additional capacitors 42, shunting the balanced common link 12, introduce second harmonic components of current during the time of line gate operation. Essentially, the operation provides a double resonant transfer in which energy is first transferred from the line storage capacitance 31 to the common link storage capacitance 42 and then is transferred from the common link storage capacitance 42 to complete the transfer between interconnected line circuits.

It may be shown by mathematical analysis that for optimum transfer of signal with no crosstalk or interference due to signal storage in the common link 12, the common link storage capacitance 42 should have a value which is two-thirds that of the line storage capacitance 31. In a large scale communication system, each line gate may be expected to provide a certain value of capacitance in the common link connecting each of the line gates. Consider, for example, that such capacitance amounts to 20 $\mu\mu$f. per line gate, which is not unreasonable to expect. A system including 200 lines thus would present a total capacitance on the common link of $200\times20$ $\mu\mu$f.=.004 $\mu$f. We may expect that the line storage capacitance would amount to .023 $\mu$f. Thus the common link parasitic capacitance would be approximately 17% of the line gate capacitance value, and such a percentage would cause difficulty due to the storage of crosstalk energy and imperfect transfer.

By utilizing harmonic transfer in which the common link capacitance is increased to a value which is two-thirds that of the line gate storage capacitance or, in the above example, $\frac{2}{3}\times.023$ $\mu$f.=.015$\mu$f., a controlled transfer without storage is provided. The reason for this nonstorage condition during transfer which, as indicated, may be shown mathematically, is the production of second harmonic waveforms in addition to the fundamental components. It is the second harmonic of current which is responsible for the desirable end result of nonstorage in the link and thus absence of crosstalk.

Crosstalk also is produced due to current leakage through imperfect line gates. The harmonic transfer common link capacitance 42 and shunt resistance 43 serve to eliminate crosstalk due to this condition as well as providing the line gate control and bias current return paths without short circuiting the signal current. To maintain crosstalk at a sufficiently low level, the line gate resistance ordinarily must be at a value which, at best, is difficult to realize. However, with the insertion of the shunt resistance 43 of a relatively low value, of the order of 2000 ohms, the requisite line gate resistance is easily realized. The impedance of the harmonic transfer capacitance 42 at operating frequencies also assists in providing crosstalk protection due to such line gate leakage.

The above analysis of harmonic transfer without loss is based upon utilization of lossless components. Such a situation of course does not exist in practice, and the loss actually encountered in components may result in some storage in the harmonic transfer capacitance 42. Since the common link capacitance was purposely increased over that provided by existing stray capacitance, the amount of storage in the common link may also be increased, with a corresponding increase in resultant crosstalk.

In accordance with our invention, a clamping gate 45 is connected across the common link 12 and serves to remove any signal stored in the harmonic transfer capacitance 42 when the line gates are disabled at the termination of a signal transfer. In this fashion crosstalk-producing signal storage is eliminated while the benefits of harmonic transfer are retained. Normally, such clamping would be required in any event in order to remove the crosstalk-producing signal storage in the parasitic capacitance of the common link in a large scale system.

The clamping gate 45 may comprise any fast-acting switch, as known in the art, which is controlled by a signal from the common control 40 received at the proper time to enable the switch to connect the common link 12 directly to ground. Thus the capacitance 42 is discharged instantaneously to ground, and the circuit is prepared for the signal transfer in the succeeding time slot.

A typical operation of our novel circuit arrangement, as incorporated in a telephone system, will now be described with reference to FIG. 3. Consider that in a particular time slot of microsecond duration in a repetitive cycle of such time slots, a connection is established between telephones 50 and 51. In this instance a signal from the common control 40 is transmitted simultaneously to the line circutis for each of telephones 50 and 51 at the beginning of the time slot.

The line gate diodes 33 in each of these line circuits were back-biased by sources such as 34 supplying a direct-current voltage in the series circuit including the secondary coil of transformer 41, inductance 35 and 32, the diodes 33, and resistance 43 in the common link 12 to ground. Also, prior to this time slot, speech signals from each of the telephones 50 and 51 were stored in the corresponding line storage capacitance 31 in a direction serving to back-bias one of the line gate diodes 33.

The control signal is applied through the transformer 41 and is of a proper magnitude and polarity to overcome the back-bias potential and break down the line gate diodes 33 to their low impedance condition. The path for this enabling operation includes the capacitance 31, inductance 32, diodes 33, and common link capacitance 42 to ground, the capacitance 31 and 42 providing essentially short circuits at pulse frequency. Upon establishment of the low impedance state in the diodes 33 and passage therethrough of the pulse current which is slightly larger than the peak transfer current, the signal stored in the line capacitance 31 is discharged through the resonant transfer inductance 32 and diodes 33 into the common link 12.

A complete interchange of the signal stored in the respective interconnected line circuits during the time slot is realized by virtue of the resonant transfer inductance 32 and the harmonic transfer capacitance 42. The inductance 32 is indicated in FIG. 3 as a part of the line circuit, but resonant transfer will be implemented equally as well with the inductance located in the common link. Thus during the time slot, with the line gate diodes 33 reduced to their low impedance state, the charge on the capacitance 31 in the line circuit of the telephone 50 is transferred first to the common link capacitance 42 and thereafter from the common link capacitance 42 to the capacitance 31 in the line circuit of the telephone 51.

A similar transfer is effected in the opposite direction from the line circuit of the telephone 51 to the line circuit of the telephone 50 via the common link 12. Upon removal of the line gate enabling signal at the end of the time slot transfer interval, the line capacitance 31 and common link capacitance 42 may contain speech or control pulse energy, which energy must be removed to prevent a build-up of voltage in a number of repetitive cycles which may eventually destroy the operation. Such energy is removed from capacitance 42 by the operation of the clamp circuit 45 immediately following removal of the line gate control pulse.

The inductance 35 serves a dual purpose in the line circuit operation. As indicated, it provides a direct-current path from the source 34 to back-bias the line gate diodes 33. In addition, the inducance 35 serves to eliminate a build-up of charge due to control pulse current flowing through the capacitance 31, thereby providing a storage element free of harmful control signal during the interval between appearances of the assigned time slot. In this respect the inducance 35 maintains the level of the net direct-current voltage across the capacitance 31 at zero. Advantageously, the inducance 35 carries a small, average direct current, thereby permitting the employment of a small coil. The inducance of this coil must, however, be large at voice frequencies in order to avoid an appreciable mismatch with the line filter.

In accordance with one aspect of the illustrative embodiment of this invention, the inducance 35 in the line circuit may be replaced by a conventional transformer coupling to the telephone, referred to in the art as a "repeat coil," as indicated in line circuit 60 of FIG. 3. Also, the leakage inductance of the control pulse transformer 41 may be used for the resonant transfer operation, thus reducing component requirements still further by possible elimination of the inductance 32. In any event, a resonant transfer inductance is required only in one conductor of the line circuit since balance during the resonant transfer operation is not critical relative to the remainder of the time division cycle when such balance, or the lack of it, is a factor contributing to crosstalk.

It is to be understood that the above-described arrangements are illustrative of the application of the principles of the invention. Numerous other arrangements may be devised by those skilled in the art without departing from the spirit and scope of the invention.

What is claimed is:

1. A time division communication system comprising a plurality of lines each terminated by individual first gating means, first capacitor means connected to each of said lines, means for applying signals to said first capacitor means, a communication link providing an uninterrupted connection between said first gating means terminating distinct groups of said lines, second capacitor means and second gating means connected in parallel between said link and ground, means for enabling a selected pair of said first gating means during a first time interval to complete a circuit including said communication link for the transfer of said signals between said first and second capacitor means, and means for enabling said second gating means during a second time interval to discharge any signal remaining in said second capacitor means.

2. In a time division communication system having a plurality of line circuits and a common communication link circuit, the combination comprising first capacitor means in each of said line circuits, second capacitor means connected directly from ground to said common link circuit, means comprising only a line gate individual to each of said lines for connecting said line circuits to said link circuit, each of said line gates comprising diode means, means for initially biasing said diode means in a high impedance state, and means for enabling a selected pair of said line gates concurrently during a first time interval to complete a circuit including said communication link for transferring signals between said first and second capacitor means, said enabling means comprising means for biasing said diodes in a low impedance state.

3. The combination in accordance with claim 2 and further comprising clamping means connected between said common link circuit and ground, and means for enabling said clamping means during a second time interval for discharging said second capacitor means.

4. The combination in accordance with claim 2 and further comprising inductance means connected in circuit with said line gates and first and second capacitor means to permit a resonant signal transfer between said first and second capacitor means upon enablement of said selected pair of line gates.

5. The combination in accordance with claim 4 wherein said second capacitor means comprises two-thirds the capacitance of one of said first capacitor means to permit a harmonic signal transfer between said first and second capacitor means upon enablement of said selected pair of line gates.

6. A time division communication system comprising a plurality of lines each having a pair of conductors, first capacitor means connected to each of said line conductors, a common communication link comprising a pair of conductors, second capacitor means connected between each of said common link conductors and ground, means comprising a line gate individual to each of said lines for connecting said lines to said link, said line gates each comprising diode means connected between said first and second capacitor means, a bias voltage source, means connecting said source to said line conductors for biasing said diode means in a high impedance state, first direct-current conducing means shunting said first capacitor means between said bias voltage source and said diodes in each of said lines, second direct-current conducting means shunting said second capacitor means between said common link and ground, means for enabling a selected pair of said line gates concurrently during a first time interval comprising an enabling signal source, and means for coupling said source to the diodes of said selected pair of line gates to place said diodes in a low impedance state.

7. A time division communication system in accordance with claim 6 and further comprising clamping means connected to said common link, and means for enabling said clamping means in a second time interval to discharge said second capacitor means.

8. A time division communication system in accordance with claim 6 wherein said coupling means comprises a secondary transformer winding in said bias source connecting means, said first and second capacitor means completing a discharge circuit for signals from said enabling signal source.

9. In a time division communication system having a plurality of balanced lines and a balanced common communication link, the combination comprising line gating means individual to each of said lines and having one side connected to both conductors of the corresponding line and the opposite side connected to both conductors of said common link, first signal storage means connected between the conductors in each of said lines, second signal storage means connected from the conductors of said common link to ground, first means for enabling a selected pair of said line gating means concurrently to permit an interchange of signals in said first storage means through said second storage means, link gating means connected between the conductors of said common link, second means for enabling said link gating means to remove any signal stored in said second storage means, and means for activating in sequence said first and second enabling means.

10. The combination in accordance with claim 9 wherein said line gating means comprises a diode in each line conductor, a bias source, and means for connecting said bias source to said diodes, said bias source connecting means comprising first direct-current conducting means connected between said bias source and each of said line conductors, and second direct-current conducting means connected in parallel with said second storage means from each common link conductor to ground.

11. The combination in accordance with claim 10 wherein said first direct-current conducting means comprises first inductance means and said second direct-current conducting means comprises resistance means.

12. The combination in accordance with claim 10 wherein said first enabling means comprises a signal source and means for coupling said signal source to said bias source connecting means, and wherein said first and second storage means comprise capacitance means to provide a discharge path for signals coupled from said signal source to said bias source connecting means.

13. The combination in accordance with claim 11 and further comprising inductance means in said circuit between said first and second storage means for providing a resonant transfer of signals between said first and second storage means with said selected pair of line gating means enabled.

14. The combination in accordance with claim 13 wherein said second storage means comprises two-thirds the capacitance of one of said first storage means, to permit a harmonic signal transfer between said first and second storage means upon enablement of said selected pair of line gating means.

References Cited in the file of this patent

UNITED STATES PATENTS

| | | |
|---|---|---|
| 2,773,937 | Morris | Dec. 11, 1956 |
| 2,830,125 | Elliott | Apr. 8, 1958 |
| 2,833,862 | Tolson | May 6, 1958 |
| 2,917,583 | Burton et al. | Dec. 15, 1959 |
| 2,927,166 | Shirman | Mar. 1, 1960 |
| 2,936,338 | James | May 10, 1960 |
| 2,962,551 | Johannesen | Nov. 29, 1960 |
| 2,962,552 | Crowley | Nov. 29, 1960 |